(12) United States Patent
Kaminaga

(10) Patent No.: US 9,068,606 B2
(45) Date of Patent: Jun. 30, 2015

(54) CLUTCH SWITCHING DEVICE AND TWIN-CLUTCH TYPE TRANSMISSION COMPRISING CLUTCH SWITCHING DEVICE

(75) Inventor: Seiji Kaminaga, Aichi (JP)

(73) Assignee: Aichi Machine Industry, Co., Ltd., Nagoya (JP)

( * ) Notice: Subject to any disclaimer, the term of this patent is extended or adjusted under 35 U.S.C. 154(b) by 102 days.

(21) Appl. No.: 13/982,324

(22) PCT Filed: Feb. 14, 2011

(86) PCT No.: PCT/JP2011/053598
§ 371 (c)(1),
(2), (4) Date: Jul. 29, 2013

(87) PCT Pub. No.: WO2012/111165
PCT Pub. Date: Aug. 23, 2012

(65) Prior Publication Data
US 2013/0306424 A1    Nov. 21, 2013

(51) Int. Cl.
*F16D 28/00* (2006.01)
*F16D 21/06* (2006.01)
*F16D 23/12* (2006.01)
*F16D 21/00* (2006.01)

(52) U.S. Cl.
CPC ............... *F16D 23/12* (2013.01); *F16D 21/06* (2013.01); *F16D 28/00* (2013.01); *F16D 2021/0646* (2013.01); *F16D 2023/123* (2013.01); *F16D 21/00* (2013.01)

(58) Field of Classification Search
CPC ................ F16D 2021/0638; F16D 2021/0646
USPC .......................................................... 192/48.2
See application file for complete search history.

(56) References Cited

U.S. PATENT DOCUMENTS

| 8,397,887 | B2 * | 3/2013 | Reisch et al. ................... 192/20 |
| 2003/0075412 | A1 * | 4/2003 | Heiartz et al. .................. 192/20 |
| 2009/0301835 | A1 | 12/2009 | Tumback |
| 2011/0005886 | A1 | 1/2011 | Fenn et al. |
| 2011/0094844 | A1 * | 4/2011 | Schlieker ..................... 192/48.2 |

FOREIGN PATENT DOCUMENTS

| JP | 2004-308709 A | 11/2004 |
| JP | 2009-527708 A | 7/2009 |
| JP | 2009-281570 A | 12/2009 |

OTHER PUBLICATIONS

Extended European Search Report for the corresponding European Application No. 11858771.6, issued on Jul. 10, 2014.

* cited by examiner

*Primary Examiner* — Richard Lorence
(74) *Attorney, Agent, or Firm* — Global IP Counselors, LLP (57) ABSTRACT

A clutch device is configured to switch between a first clutch and a second clutch. The clutch device includes a fixed sleeve having a first male thread. The fixed sleeve is coaxially arranged around an exterior of a second input shaft. A first slider has a first internal female thread and a second external male thread. The first slider is arranged externally around the fixed sleeve. The second slider has a second internal female thread. The second slider is arranged around the exterior of the first slider to rotate and move in an axial direction. A first release bearing member is interposed between a member on the first clutch side and the second slider. A second release bearing member is interposed between a member on the side of the second clutch and the first slider. A first motor rotates the first slider. A second motor rotates the second slider.

20 Claims, 9 Drawing Sheets

CLUTCH SWITCHING DEVICE AND TWIN-CLUTCH TYPE TRANSMISSION COMPRISING CLUTCH SWITCHING DEVICE

CROSS-REFERENCE TO RELATED APPLICATIONS

This application is a U.S. National Stage of International Application No. PCT/JP2011/053598, filed Feb. 14, 2011.

BACKGROUND

1. Field of the Invention

The present invention relates to a clutch switching device and to a twin-clutch type transmission.

2. Background Information

As disclosed in Japanese Laid-Open Patent Application No. 2009-281570,clutch switching devices have been proposed that basically comprises a first clutch, a second clutch, a first release bearing, a second release bearing, a fixed sleeve, a first driving sleeve, a first moved sleeve, a second driving sleeve, a second moved sleeve, a first motor and a second motor. The first release bearing is coupled to the first clutch. The second release bearing is coupled to the second clutch. The fixed sleeve is disposed coaxially on the outer peripheries of both a first input shaft to which the first clutch is connected and a second input shaft to which the second clutch is connected. Also the fixed sleeve has a fixed location in a transmission housing. The first driving sleeve is rotatably supported by an inside periphery of the fixed sleeve. The first moved sleeve is threadedly engaged with the inside peripheral side of the first driving sleeve and a tip of which is linked with the second release bearing. The second driving sleeve is rotatably supported by an outside peripheral side of the fixed sleeve. The second moved sleeve is threadedly engaged with the outside peripheral side of the second driving sleeve and a tip of which is linked with the first release bearing. The first motor drives the first driving sleeve. The second motor drives the second driving sleeve.

In this device, solely through independent rotational driving of the first and second driving sleeves by each of the motors, the first and second clutches, coupled to the first and second release bearings via the first and second moved sleeves, are turned on and off.

In the clutch switching device disclosed in Japanese Laid-Open Patent Application No. 2009-281570, each clutch requires a respective driving sleeve and a respective moved sleeve, and moreover a fixed sleeve rotatably supporting these sleeves is required. Thus, the number of components is increased. Further, a configuration is used in which each driving sleeve and each moved sleeve and the fixed sleeve are disposed coaxially in nested fashion in order of diameter. Thus, there has been the problem of increased size in the radial direction.

SUMMARY

One object of the present invention is to provide a clutch switching device that has a smaller number of components and that is more compact as compared to the conventional clutch switching device.

In view of the above, one aspect of the present invention is to provide a clutch switching device that able to switch between a first clutch capable of transmitting power to a first input shaft rotatably supported by a case, and a second clutch capable of transmitting the power to a second input shaft that is disposed coaxially with an outside peripheral side of the first input shaft and is rotatably supported by the case, the clutch switching device comprising: a fixed sleeve, having a hollow shaft portion on an outside peripheral surface of which is formed a first male thread, the fixed sleeve being mounted and fixed on the case such that the hollow shaft portion is coaxially arranged on the outside peripheral side of the second input shaft; a first slider, on an inside peripheral surface of which is formed a first female thread threadedly engaged with the first male thread and on an outside peripheral surface of which is formed a second male thread, the first slider being threadedly engaged with the fixed sleeve rotatably with respect to the fixed sleeve and movably in the axial direction; a second slider, on an inside peripheral surface of which is formed a second female thread threadedly engaged with the second male thread, the second slider being threadedly engaged with the first slider rotatably with respect to the first slider and movably in the axial direction; a first release bearing member, interposed between the second slider and a first clutch member constituting the first clutch; a second release bearing member, interposed between the first slider and a second clutch member constituting the second clutch; and an actuator capable of causing the first slider and the second slider to rotate.

In the clutch switching device of this invention, a fixed sleeve is mounted and fixed on a case such that a hollow shaft portion, on an outside peripheral surface of which is formed a first male thread, is coaxially disposed on an outside peripheral side of a second input shaft; a first slider, on an inside peripheral surface of which is formed a first inner thread which is threadedly engaged with the first male thread, and on an outside peripheral surface of which is formed a second male thread, is threadedly engaged with the fixed sleeve, rotatably and movably in the axial direction; a second slider, on an inside peripheral surface of which is formed a second female thread which is threadedly engaged with the second male thread, is threadedly engaged with the first slider, rotatably and movable in the axial direction; and by using an actuator to cause the first slider and the second slider to rotate, opening/closing of the first clutch and second clutch is performed via a first release bearing member and second release bearing member.

Only a slider corresponding to each of the clutches and a fixed sleeve which supports these sliders rotatably and movably in the axial direction are provided, so that the number of components can be reduced. As a result, the device can be made more compact.

In the clutch switching device of the invention, the actuator can comprise a first motor capable of causing the first slider to rotate and a second motor capable of causing the second slider to rotate.

Further, the actuator can also comprise a reversal mechanism for reversing the rotation of the first motor or the rotation of the second motor and transmitting power to the first slider or to the second slider. In this way, the rotation of the first motor or the rotation of the second motor is reversed to transmit power to the first slider or to the second slider.

Further, the clutch switching device of the invention can comprise driving control means for performing driving control of the first motor and the second motor, the driving control means constituting means for performing driving control of the first motor and the second motor such that, when a switching instruction for switching between the first clutch and the second clutch is issued, the movement direction of the axial-direction movement of the first slider and the movement direction of the axial-direction movement of the second slider are made mutually opposite directions.

In this way, merely by performing driving control of the first motor and second motor such that the movement direction of the axial-direction movement of the first slider and the movement direction of the axial-direction movement of the second slider are made mutually opposite directions, switching between the first clutch and the second clutch can be performed.

In a clutch switching device of this invention, the actuator can comprise a motor capable of causing the first and second sliders to rotate, and a reversal mechanism for reversing the rotation of the motor and transmitting power to the first slider or the second slider. In this way, the motor rotation can be reversed and power can be transmitted to the first slider or to the second slider.

In a clutch switching device of this invention, the leads of the first male thread and the first female thread, and the leads of the second male thread and the second female thread, can be set to be substantially the same. In this way, the distance moved in the axial direction by the first slider when the first slider is rotated once, and the distance moved in the axial direction by the second slider when the second slider rotates once on the first slider, can be made the same.

Further, the leads of the second male thread and the second female thread can be set to be larger than the leads of the first male thread and the first female thread. In this way, the distance moved in the axial direction by the second slider when the second slider rotates once on the first slider can be made greater than the distance moved in the axial direction by the first slider when the first slider rotates once.

Further, in a clutch switching device of this invention, the leads L of the second male thread and the second female thread can be set so as to satisfy $L < \pi \cdot d \cdot \mu$, where d is the effective thread diameter of the second male thread and second female thread and $\mu$ is the coefficient of friction between the second male thread and the second female thread. In this way, there is no natural relaxing of the screw engagement between the second male thread and the second female thread. That is, the second slider does not undergo natural axial-direction movement relative to the first slider.

A second clutch switching device of this invention is able to switch between a first clutch capable of transmitting power to a first input shaft rotatably supported by a case, and a second clutch capable of transmitting the power to a second input shaft that is disposed coaxially with an outside peripheral side of the first input shaft, and is rotatably supported by the case, the clutch switching device comprising: a driving sleeve, on an outside peripheral surface of which is formed a first male thread and on an inside peripheral surface of which is formed a first female thread, the driving sleeve being supported by the case in a state in which only rotation is allowed; a first slider, on an outside peripheral surface of which is formed a second male thread which is threadedly engaged with the first female thread, the first slider being threadedly engaged with the driving sleeve in a state in which only axial-direction movement relative to the driving sleeve is allowed; a second slider, on an inside peripheral surface of which is formed a second female thread which is threadedly engaged with the first male thread, the second slider being threadedly engaged such that both rotation and axial-direction movement relative to the driving sleeve are allowed; a first release bearing member, interposed between the second slider and a first clutch member constituting the first clutch; a second release bearing member, interposed between the first slider and a second clutch member constituting the second clutch; and an actuator capable of causing the driving sleeve and the second slider to rotate.

In the second clutch switching device of this invention, a driving sleeve is supported by a case in a state which allows only rotation, a first male thread being formed on an outside peripheral surface of the driving sleeve, and a first female thread being formed on an inside peripheral surface of the driving sleeve; a first slider, on an outside peripheral surface of which is formed a second male thread which is threadedly engaged with the first female thread, is threadedly engaged with the driving sleeve in a state in which only axial-direction movement is allowed; a second slider, on an inside peripheral surface of which is formed a second female thread which is threadedly engaged with the first male thread, is threadedly engaged with the driving sleeve such that both rotation and axial-direction movement are possible; and by having an actuator cause the first slider and the second slider to rotate, opening/closing of the first clutch and second clutch is performed via a first release bearing member and second release bearing member.

Only a slider corresponding to each of the clutches and a driving sleeve which supports these sliders rotatably and movably in the axial direction are provided, so that the number of components can be reduced. As a result, the device can be made more compact.

In this second clutch switching device of the invention, the actuator can comprise a first motor capable of causing the driving sleeve to rotate and a second motor capable of causing the second slider to rotate.

Further, the actuator can also comprise a reversal mechanism for reversing the rotation of the first motor or the rotation of the second motor and transmitting power to the driving sleeve or to the second slider. In this way, the rotation of the first motor or the rotation of the second motor can be reversed and power can be transmitted to the driving sleeve or to the second slider.

Further, in a second clutch switching device of this invention, the first male thread and the second female thread can be formed in a thread winding direction opposite the thread winding direction of the second male thread and the first female thread. In this way, using a simple configuration, the direction of axial-direction movement of the first slider and the direction of axial-direction movement of the second slider can be made opposite directions.

Further, a second clutch switching device of this invention comprises driving control means for performing driving control of the first motor and the second motor, the driving control means performing driving control of the first motor and the second motor such that, when a switching instruction to switch between the first clutch and the second clutch is issued, the movement direction of the axial-direction movement of the first slider and the movement direction of the axial-direction movement of the second slider are made mutually opposite directions.

In this way, merely by performing driving control of the first motor and second motor such that the movement direction of the axial-direction movement of the first slider and the movement direction of the axial-direction movement of the second slider are made mutually opposite directions, switching between the first clutch and the second clutch can be performed.

In the second clutch switching device of this invention, the actuator can comprise a motor capable of causing the driving sleeve and second slider to rotate.

In the second clutch switching device of the invention in which this actuator comprises a motor, the motor can be made such that the second slider is caused to rotate at a higher speed than the driving sleeve. In this way, the second slider can be caused to rotate at a higher speed than the driving sleeve.

Further, in the second clutch switching device of this invention, the actuator can comprise a reversal mechanism for reversing the rotation of the motor and transmitting power to the driving sleeve or to the second slider. In this way, the rotation of the motor is reversed to transmit power to the driving sleeve or to the second slider.

In this case, the first male thread and the second female thread can be formed in a thread winding direction opposite the thread winding direction of the second male thread and the first female thread.

Further, in the second clutch switching device of this invention, the leads of the first male thread and the second female thread can be set to be larger than the leads of the second male thread and the first female thread. In this way, the distance moved in the axial direction by the second slider when the second slider rotates once over the driving sleeve can be made greater than the distance moved in the axial direction by the first slider when the driving sleeve rotates once.

In the second clutch switching device of this invention, the leads L of the first male thread and the second female thread can be set so as to satisfy $L<\pi \cdot d \cdot \mu$, where d is the effective thread diameter of the first male thread and second female thread and μ is the coefficient of friction between the first male thread and the second female thread. In this way, there is no natural relaxing of the screw engagement between the first male thread and the second female thread. That is, the second slider does not undergo natural axial-direction movement relative to the driving sleeve.

A twin-clutch type transmission of this invention comprises a first power transmission path for changing gears to a first gear ratio for inputting power to the first input shaft, and a second power transmission path for changing gears to a second gear ratio for inputting the power to the second input shaft. By switching between the first clutch and the second clutch using the first or second clutch switching device of this invention according to any of the above aspects, a switch is made between the first power transmission path and the second power transmission path, and the gear is changed to transmit the power to an output shaft.

In the twin-clutch type transmission of this invention, by using a first or second clutch switching device of the invention according to any of the above-described modes to switch between a first clutch and a second clutch, switching between a first power transmission path and a second power transmission path is performed to change gears and transmit power to an output shaft. It is therefore possible to reduce the number of components, makes the device more compact, and to realize other advantageous results similar to those exhibited by the first or second clutch switching device of the invention.

DETAILED DESCRIPTION OF THE EMBODIMENTS

Next, embodiments are used to describe modes for carrying out the invention.
Embodiment 1

Figure 1:
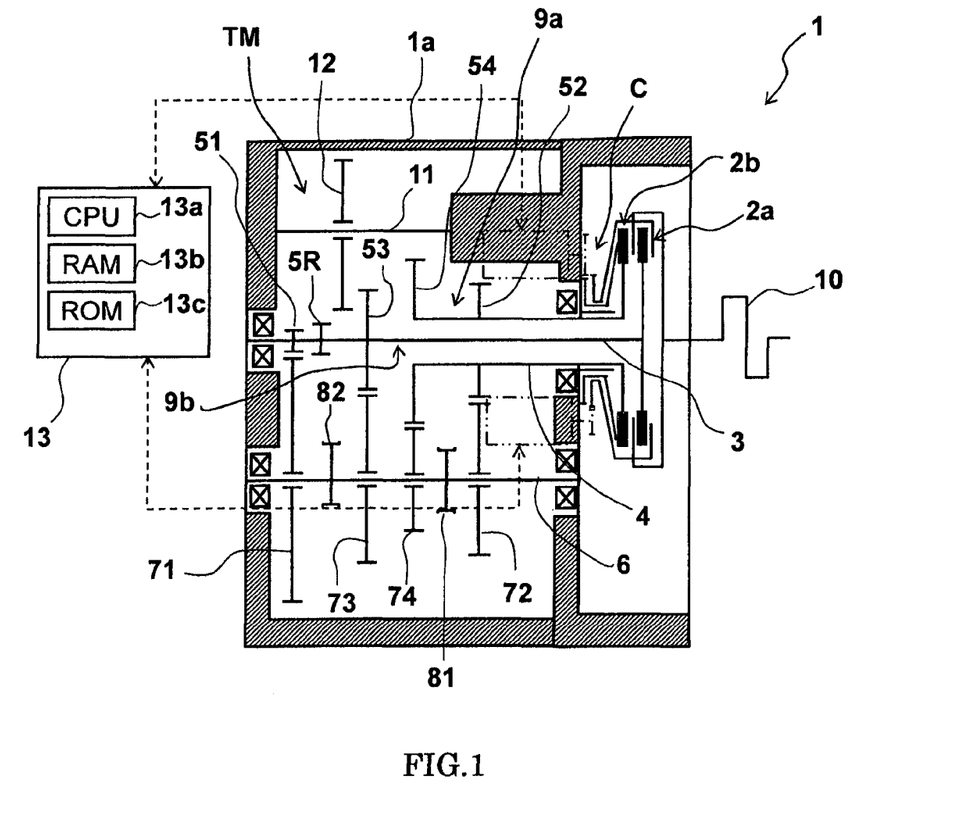
FIG. 1 is a schematic diagram showing a basic configuration of a twin-clutch type transmission 1 that is provided with a clutch switching device in accordance with one embodiment of the invention.
Figure 2:
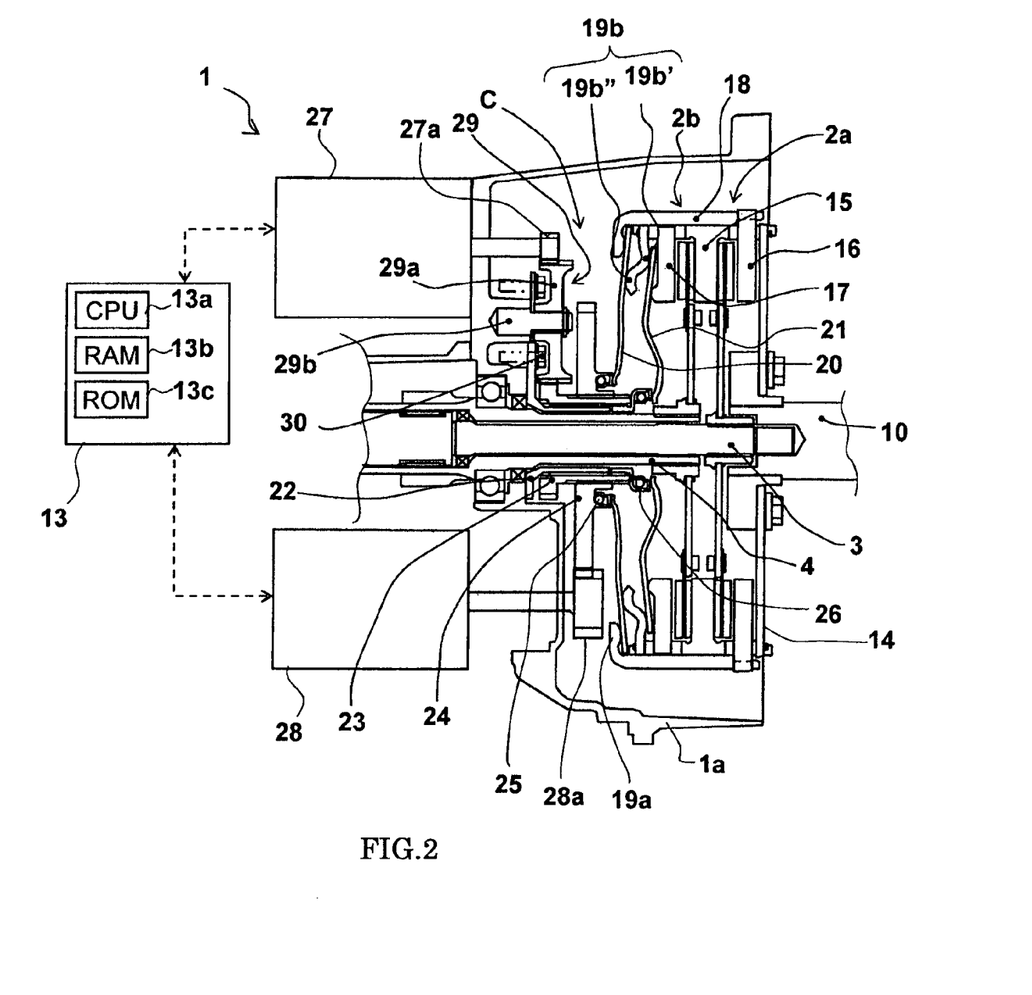
FIG. 2 is an enlarged view of principal portions of the twin-clutch type transmission 1 of the embodiment.

FIG. 1 is a schematic diagram showing a basic configuration of a twin-clutch type transmission 1 that is provided with a clutch switching device in accordance with one embodiment of the invention. FIG. 2 is an enlarged view of principal portions of the twin-clutch type transmission 1 of the embodiment.

As shown in FIG. 1, the twin-clutch type transmission 1 is provided with a clutch switching device C of this embodiment. The twin-clutch type transmission 1 comprises a transmission case 1a, a first clutch 2a, a second clutch 2b, a first input shaft 3, a second input shaft 4 and an output shaft 6. The first input shaft 3 is connected via the first clutch 2a to a crankshaft 10 of an internal combustion engine (not shown). The second input shaft 4 is connected via the second clutch 2b to the crankshaft 10 of the internal combustion engine (not shown). The second input shaft 4 fits onto the first input shaft 3 in a coaxial state. The output shaft 6 is disposed in parallel with the first input shaft 3 and the second input shaft 4. The output shaft 6 is connected via a transmission mechanism TM with the first input shaft 3 and the second input shaft 4. The clutch switching device C of the embodiment performs switching between the first clutch 2a and the second clutch 2b. The transmission case 1a accommodates the first clutch 2a, the second clutch 2b, the first input shaft 3, the second input shaft 4, the output shaft 6 and at least a part of the clutch switching device C.

The first clutch 2a comprises a first clutch disc that is splined to or otherwise mounted on the first input shaft 3 and friction material that is mounted on an outside peripheral side of the first clutch disc. The first clutch 2a further comprises a mid-pressure plate 15 and a first pressure plate 16. The mid-pressure plate 15 and the first pressure plate 16 are disposed on opposite sides of the friction material. The first clutch 2a further comprises a first diaphragm spring 20 that is connected via a drive plate 18 to the first pressure plate 16.

The second clutch 2b comprises a second clutch disc that is splined to or otherwise mounted on the second input shaft 4 and friction material that is mounted on an outside peripheral side of the second clutch disc. The second clutch 2b further comprises the mid-pressure plate 15 and a second pressure plate 17. The mid-pressure plate 15 and the second pressure plate 17 are disposed on opposite sides of the friction material. The second clutch 2b further comprises a second diaphragm spring 21 that is connected to the second pressure plate 17.

The mid-pressure plate 15 is configured to enable integrated rotation with a cover plate 14 mounted on the crankshaft 10. Thus, power from the crankshaft 10 is input via the cover plate 14 to the mid-pressure plate 15.

On the end of the drive plate 18, on the side opposite the crankshaft 10, is formed a bent portion 19a that is bent to the inside peripheral side. On the inside perimeter of the drive plate 18 is formed a bent member 19b at a position spaced from the bent portion 19a toward the crankshaft 10. The bent member 19b includes a protruding portion 19b' which protrudes on the side of the crankshaft 10 and a protruding portion 19b" which protrudes on the side opposite the side of the crankshaft 10. The protruding portion 19b' and 19b" form an inverted S-shape in cross-section. The protruding portion 19b' and 19b"are formed in order from the outside peripheral side toward the inside perimeter. A first diaphragm spring 20 is disposed between the inner face of the bent portion 19a and the protruding portion 19b" of the bent member 19b so as to abut the bent portion 19a and the protruding portion 19b". A second diaphragm spring 21 is disposed between the protruding portion 19b' of the bent member 19b and the second pressure plate 17 so as to abut the protruding portion 19b' and the second pressure plate 17. The second pressure plate 17 and the second diaphragm spring 21 are in abutment on the inside in the radial direction from the protruding portion 19b'.

The transmission mechanism TM comprises a drive gear 51, a drive gear 52, a drive gear 53, a drive gear 54, a driven gear 71, a driven gear 72, a driven gear 73, a driven gear 74, a reverse drive gear 5R and a reverse drive (not shown). The drive gear 51 and the driven gear 71 are used to establish a first speed. The drive gear 52 and the driven gear 72 are used to establish a second speed. The drive gear 53 and the driven gear 73 are used to establish a third speed. The drive gear 54 and the driven gear 74 are used to establish a fourth speed. The drive gears 51, 53 and reverse drive gear 5R are fixed on the first input shaft 3. The drive gears 52, 54 are fixed on the second input shaft 4. The driven gears 71, 72, 73, 74 and the reverse driven gear (not shown) are rotatably disposed on the output shaft 6. Each of the driven gears 71, 72, 73, 74 and the reverse driven gear (not shown) meshes with the corresponding drive gears 51, 52, 53, 54 and the reverse drive gear 5R. The transmission mechanism TM also comprises two synchronization devices 81 and 82 which are fixed on the output shaft 6 between the driven gears 71, 73 and the driven gears 72, 74. The transmission mechanism TM also comprises a reverse idler gear 12 that is disposed within the transmission case 1a and capable of sliding on a reverse idler shaft 11.

Using the transmission mechanism TM, a first power transmission path 9a is formed in which the rotational speed of power input to the first input shaft 3 is changed to a gear ratio constituted by an odd-numbered gear level (first speed, third speed), and power is transmitted to the output shaft 6. Also using the transmission mechanism TM, a second power transmission path 9b is formed in which the rotation speed of power input to the second input shaft 4 is changed to a gear ratio constituted by an even-numbered gear level (second speed, fourth speed) and power is transmitted to the output shaft 6.

Figure 3:
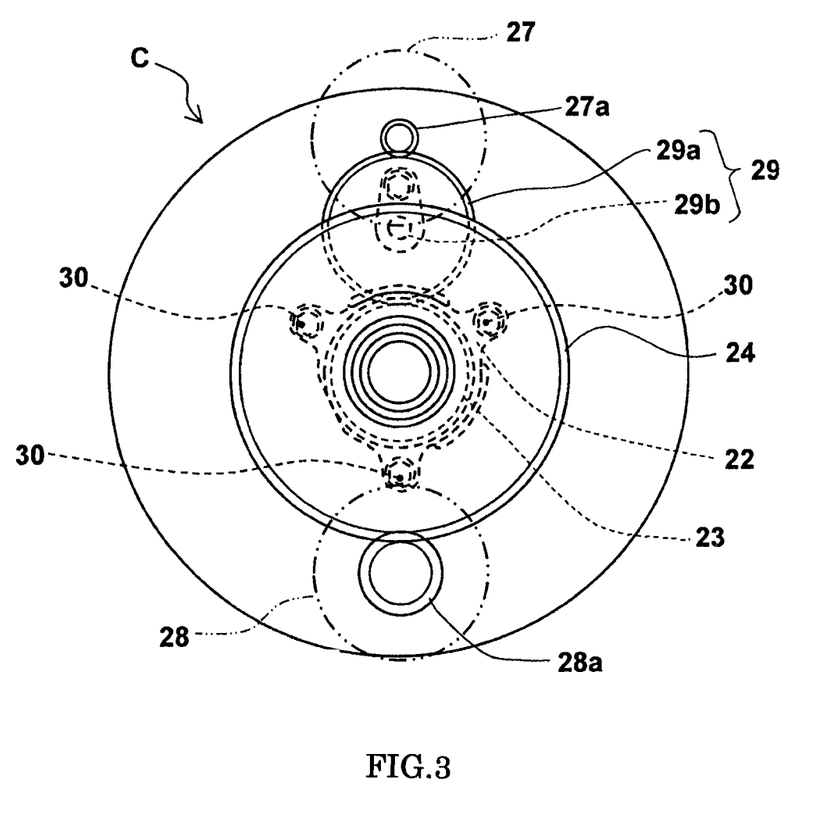
FIG. 3 is a front view of the clutch switching device C in FIG. 2, seen from the side of the crankshaft 10.
Figure 4:
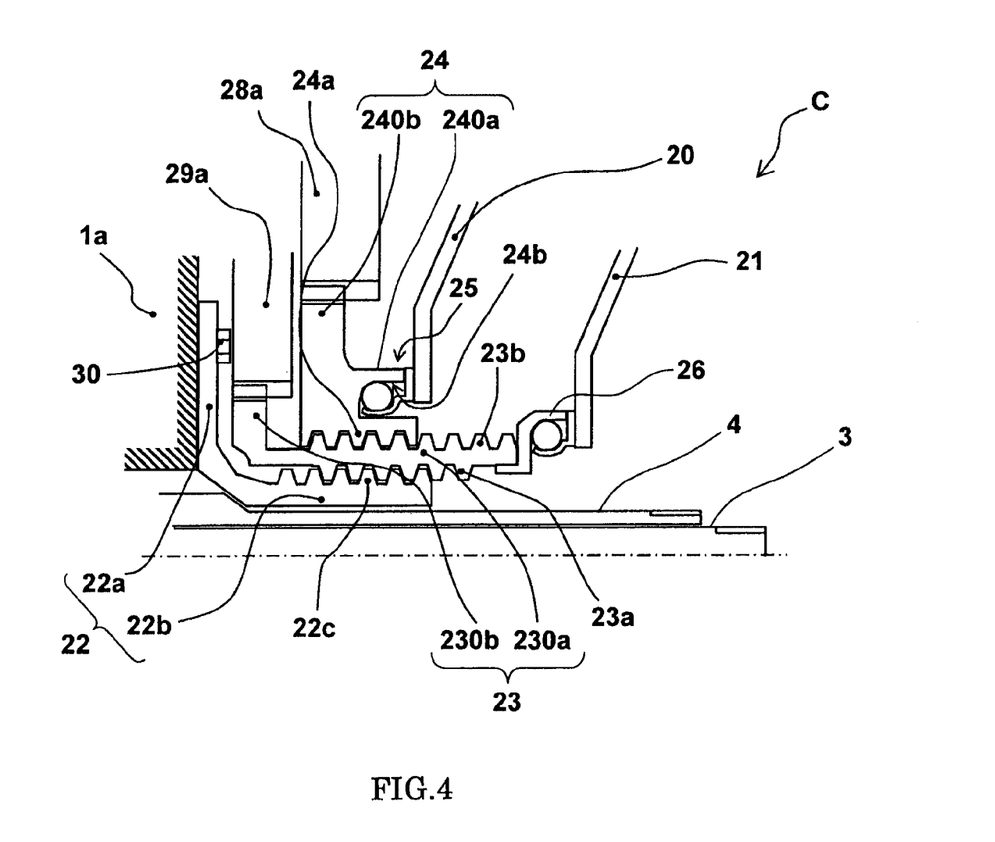
FIG. 4 is an enlarged view of principal portions of the clutch switching device C.

FIG. 3 is a front view of the clutch switching device C in FIG. 2, as seen from the side of the crankshaft 10, and FIG. 4 is an enlarged view of principal portions of the clutch switching device C.

As shown in FIGS. 3 and 4, the clutch switching device C comprises a fixed sleeve 22, a first slider 23, a second slider 24, a first release bearing 25, a second release bearing 26, a first motor 27, a second motor 28, an idler gear mechanism 29 and a clutch switching electronic control unit 13. The fixed sleeve 22 is fixedly mounted by fixing bolts 30 on the transmission case 1a. The first slider 23 is threadedly engaged on an outside peripheral side of the fixed sleeve 22. The second slider 24 is threadedly engaged on an outside peripheral side of the first slider 23. The first motor 27 is connected via the idler gear mechanism 29 to the first slider 23; a second motor 28 is connected to the second slider 24. The second release bearing 26 is linked with the first slider 23 and the second diaphragm spring 21. The first release bearing 25 is linked with the second slider 24 and the first diaphragm spring 20. The clutch switching electronic control unit 13 controls the clutch switching device C.

The fixed sleeve 22 comprises a fixed portion 22a and a hollow shaft portion 22b. The fixed portion 22a is formed in a flange shape as a portion for mounting on the transmission case 1a. The hollow shaft portion 22b is formed integrally in a shape protruding from the fixed portion 22a and the interior of which is hollow. When mounting on the transmission case 1a, the hollow shaft portion 22b is disposed coaxially with an outside peripheral side of the second input shaft 4. A first male thread 22c is formed on an outside peripheral surface of the hollow shaft portion 22b.

The first slider 23 comprises a tubular shaft portion 230a and a gear portion 230b. The tubular shaft portion 230a has formed a first female thread 23a formed on an inside peripheral surface and a second male thread 23b formed on an outside peripheral surface. The first female thread 23a is threadedly engaged with the first male thread 22c. The gear portion 230b is formed integrally on one end portion of the tubular shaft portion 230a. The gear portion 230b meshes with a pinion gear 27a of the first motor 27 via an idler gear 29a of the idler gear mechanism 29, described below.

Here, in this embodiment, the leads L1 of the first male thread 22c and of the first female thread 23a is set so as to satisfy the formula L1 <π·d1·µ1, where d1 is the effective thread diameter of the first male thread 22c and of the first female thread 23a, and µ1 is the friction coefficient between the first male thread 22c and the first female thread 23a. The lead L2 of the second male thread 23b is set to be larger than the lead L1 of the first male thread 22c (for example, L2=2× L1).

The second slider 24 comprises a tubular shaft portion 240a and a gear portion 240b. The tubular shaft portion 240a has a second female thread 24a formed on an inside peripheral surface. The second female thread 24a is threadedly engaged with the second male thread 23b. The gear portion 240b is formed integrally with the tubular shaft portion 240a. The gear portion 240b meshes with the pinion gear 28a of the second motor 28. A ring-shape groove 24b is formed on the end face of the tubular shaft portion 240a on the side opposite the side on which the gear portion 240b is formed. The ring-shape groove 24b is disposed at a position further outward in the radial direction than the second female thread portion 24a.

Here, in this embodiment, the leads L2 of the second male thread 23b and the second female thread 24a is set so as to satisfy the formula L2<π·d2·µ2, where d2 is the effective thread diameter of the second male thread 23b and the second female thread 24a, and µ2 is the friction coefficient between the second male thread 23b and the second female thread 24a. The lead L2 of the second female thread 24a is set to be larger than the lead L1 of the first female thread 23a, for example, L2=2×L1.

The idler gear mechanism 29 comprises a fixed shaft 29b fixed on the transmission case 1a and an idler gear 29a rotatably supported by the fixed shaft 29b, and reduces the rotation rate of the first motor 27 as well as reversing the rotation direction and transmitting rotation to the first slider 23. By means of the idler gear mechanism 29, the relation between the rotation rate of the motor 27 transmitted from the first pinion gear 27a via the idler gear 29a to the gear portion 230b and the rotation rate of the motor 28 transmitted from the second pinion gear 28a to the gear portion 240b is easily adjusted.

The first release bearing 25 comprises an outer race, an inner race and a plurality of balls interposed between the outer race and the inner race, the first release bearing linking the second slider 24 and the first diaphragm spring 20 in a state allowing relative rotation. An inner wall on the outside in the radial direction of the ring-shape groove 24b formed in the tubular shaft portion 240a of the second slider 24 forms the outer race, and the inner race and an inside perimeter end of the first diaphragm spring 20 are in abutment.

The second release bearing 26 comprises an outer race, an inner race and a plurality of balls interposed between the outer race and the inner race. The second release bearing links the first slider 23 and second diaphragm spring 21 in a state allowing relative rotation. The outer race is mounted and fixed on a tip of the tubular shaft portion 230a of the first slider 23. The inner race abuts an inside perimeter tip of the second diaphragm spring 21.

The clutch switching electronic control unit 13 comprises a microprocessor having a CPU 13a, RAM 13b and ROM 13c. The ROM 13c stores processing programs, data and similar. The RAM 13b temporarily stores data. The clutch switching electronic control unit 13 further comprises an input/output port and communication port (not shown).

The clutch switching electronic control unit 13 has an input port (not shown), which receives signals from sensors that detect the states of the first motor 27 and the second motor 28. For example, the clutch switching electronic control unit 13 receives motor shaft rotation rates from a rotation rate sensor which detects the rotation rates of the first motor 27 and the second motor 28. Further, the clutch switching electronic control unit 13 outputs, via an output port (not shown) driving signals or similar to the first motor 27 and the second motor 28.

Next, the operation of the twin-clutch type transmission 1 will now be explained. In particular, the switching operation between the first clutch 2a and the second clutch 2b by the clutch switching device C will now be explained.

Figure 5:
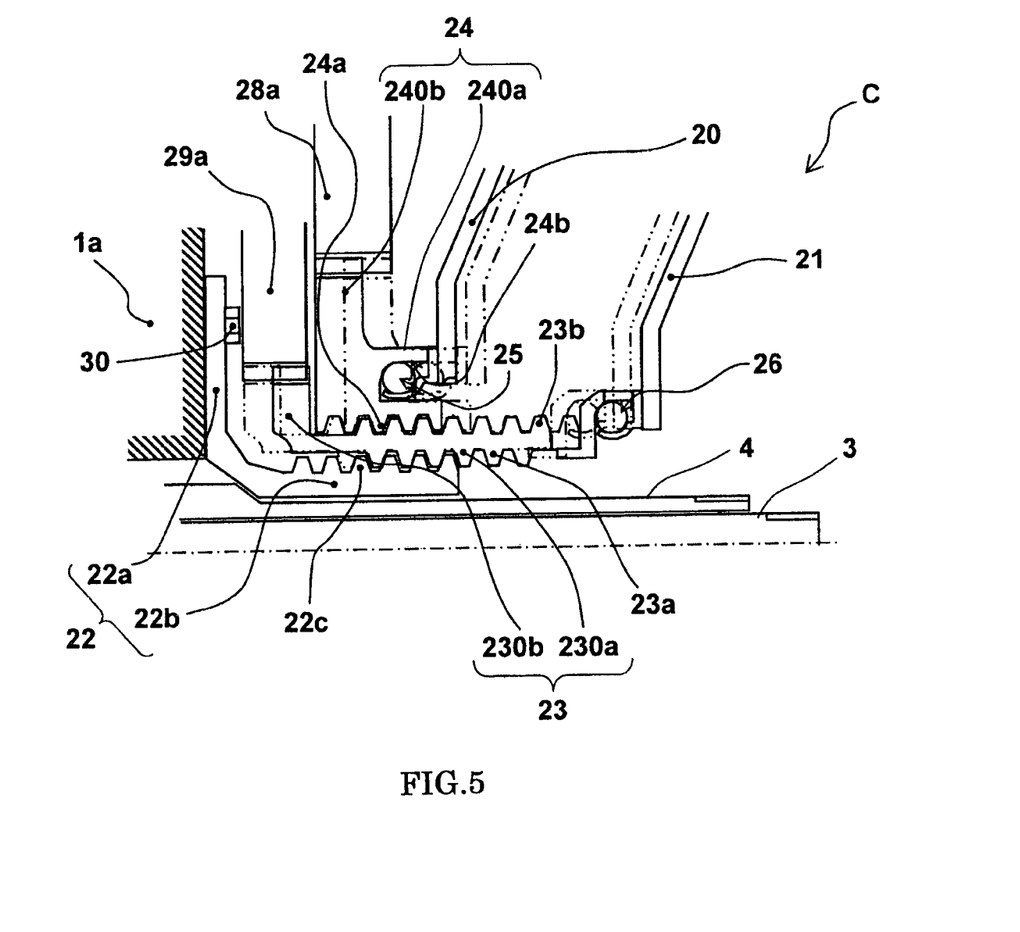
FIG. 5 is a state diagram showing a state of switching of the first clutch 2a and second clutch 2b.

FIG. 5 is a state diagram showing a state of switching of the first clutch 2a and second clutch 2b. First switching of clutches when the vehicle starts from rest will be explained. It is assumed that when the vehicle is stopped, connections of both the clutches 2a and 2b are released.

In starting from rest, the clutch switching electronic control unit 13 drives and controls the second motor 28 to drive the second slider 24 in rotation, and also drives and controls the first motor 27 such that the first slider 23 is not driven in rotation.

When the second slider 24 rotates, the second slider 24 moves in the axial direction towards both of the clutches 2a, 2b (rightward in FIG. 5) while rotating over the first slider 23, rotation of which is stopped. Also when the second slider 24 rotates, the second slider 24 presses the inside perimeter end of the first diaphragm spring 20, via the first release bearing 25, towards both of the clutches 2a, 2b (rightward in FIG. 5) against the spring force.

The first diaphragm spring 20 is thereby deformed such that the outside peripheral side moves, with the protruding portion 19b'' of the bent member 19 as a fulcrum, in the direction away from the side of both of the clutches 2a, 2b (leftward in FIG. 5). Also in concert therewith the first pressure plate 16 moves towards the first clutch disc of the first clutch 2a via the drive plate 18. Thus, the friction material of the first clutch 2a is squeeze in between the first pressure plate 16 and the mid-pressure plate 15, and power is input from the crankshaft 10 to the first input shaft 3 via the first clutch 2a.

Here, the leads L1 of the first male thread 22c and first female thread 23a and the leads L2 of the second male thread 23b and second female thread 24a are set to values so as to satisfy the formulae $L1 < \pi \cdot d1 \cdot \mu1$ and $L2 < \pi \cdot d2 \cdot \mu2$. Thus, even when electric current to the first motor 27 and the second motor 28 is stopped at the time of completion of connection of the first clutch 2a, the first slider 23 and the second slider 24 do not naturally move in the axial direction such that there is no natural switching of the clutches 2a and 2b. As a result, power consumption can be reduced.

Now follows a description of switching of the first clutch 2a and the second clutch 2b when releasing the connection of the first clutch 2a and connecting the second clutch 2b.

When releasing the connection of the first clutch 2a and connecting the second clutch 2b, the clutch switching electronic control unit 13 drives and controls the second motor 28 to stop or to rotate in the direction opposite that when starting from rest, to drive and rotate the second slider 24 in the direction opposite that when starting from rest. Also the clutch switching electronic control unit 13 drives and controls the first motor 27 so as to rotate in the same direction as the second motor 28, to drive and rotate the first slider 23 in the direction opposite that of the second slider 24.

The second slider 24 thereby moves in the axial direction to the side opposite of the side of both of the clutches 2a, 2b (leftward in FIG. 5) while rotating over the first slider 23, which is rotating in the direction opposite from that of the second slider 24, and the first slider 23 moves in the axial direction towards both of the clutches 2a, 2b (rightward in FIG. 5) while rotating over the fixed sleeve 22 which is fixed to the transmission case 1 a. Here, the leads L2 of the second male thread 23b and the second female thread 24a are set to be greater than the leads L1 of the first male thread 22c and the first female thread 23a, so that merely by stopping the second motor 28, or by rotating the second motor 28 in the direction opposite from that during a start from rest using less power than is used for the first motor 27, the second slider 24 moves in the axial direction to the side opposite the side of both of the clutches 2a, 2b (leftward in FIG. 5).

By means of movement of the second slider 24 in the axial direction to the side opposite from the side of both of the clutches 2a, 2b (leftward in FIG. 5), deformation of the first diaphragm spring 20 returns to the initial state, and accompanying this the first pressure plate 16 moves away from the side of the first clutch disc of the first clutch 2a via the drive plate 18, and the connection of the first clutch 2a is released. By means of movement of the first slider 23 in the axial direction towards both of the clutches 2a, 2b (rightward in FIG. 5), the first slider 23 presses the inside perimeter tip of the second diaphragm spring 21, via the second release bearing 26, towards both of the clutches 2a, 2b (rightward in FIG. 5) against the spring force.

By this means, the second diaphragm spring 21 is deformed such that the second pressure plate 17 moves, with the protruding portion 19b' of the bent member 19 as a fulcrum, towards the second clutch disc of the second clutch 2b (rightward in FIG. 5). In this way, the friction material of the second clutch 2b is enclosed between the second pressure plate 17 and the mid-pressure plate 15, and power is input from the crankshaft 10 to the second input shaft 4 via the second clutch 2b.

Next, switching between the first clutch 2a and the second clutch 2b when the connection of the second clutch 2b is released and the first clutch 2a is connected is explained.

When releasing the connection of the second clutch 2b and connecting the first clutch 2a, the clutch switching electronic control unit 13 drives and controls the second motor 28 so as to stop or to rotate in the same direction as during a start from rest, to drive and rotate the second slider 24 in the same direction as during a start from rest. In addition the clutch switching electronic control unit 13 drives and controls the first motor 27 so as to rotate in the same direction as the second motor 28, to drive and rotate the first slider 23 in the direction opposite that of the second slider 24. By this means, the first slider 23 and the second slider 24 move in axial directions opposite from the directions when releasing the connection of the first clutch 2a and connecting the second clutch 2b as described above, so that the connection of the second clutch 2b is released and the first clutch 2a is connected.

By means of the clutch switching device C of the embodiment explained above, when switching the clutches 2a and 2b, the first slider 23 connected via the second release bearing 26 to the second clutch 2b is threadedly engaged over the fixed sleeve 22, which is fixedly mounted on the transmission case 1a, and the second slider connected via the first release bearing 25 to the first clutch 2a is threadedly engaged over the first slider 23; the first slider and the second slider are driven in rotation by the first motor 27 and the second motor 28 to perform switching of the first clutch 2a and the second clutch 2b, so that the number of components to perform switching of the clutches 2a and 2b can be reduced. As a result, the device as a whole can be made more compact.

Further, in the clutch switching device of this embodiment, the leads L2 of the second male thread 23b and the second female thread 24a are set to be larger than the leads L1 of the first male thread 22c and the first female thread 23a, and thus the electric power to drive the second motor 28 can be made small compared with the case in which the leads L1 and L2 are set to the same value. As a result, electric power consumption can be reduced and energy efficiency can be improved.

Further, in the clutch switching device of the embodiment, the leads L1 of the first male thread 22c and the first female thread 23a and the leads L2 of the second male thread 23b and the second female thread 24a are set to values to satisfy the following formulae $L1 < \pi \cdot d \cdot \mu 1$, and $L2 < \pi \cdot d \cdot \mu 2$. As a result, even when current to the first motor 27 and the second motor 28 is stopped after driving control of the first clutch 2a and second clutch 2b, there is no natural movement in the axial direction of the first slider 23 and the second slider 24. As a result, electric power consumption can be reduced and energy efficiency can be improved.

In the clutch switching device C of the embodiment, the leads L2 of the second male thread 23b and the second female thread 24a is set to be greater than the leads L1 of the first male thread 22c and the first female thread 23a. However, the leads L2 of the second male thread 23b and the second female thread 24a and the leads L1 of the first male thread 22c and the first female thread 23a may be set to be the same.

In the clutch switching device C of the embodiment, after driving and control of the first clutch 2a and second clutch 2b, that is, after completion of clutch switching operation, electric current to the first motor 27 and the second motor 28 is halted; but even after completion of clutch switching operation, electric current to the first motor 27 and the second motor 28 may be continued.

Embodiment 2

Figure 6:
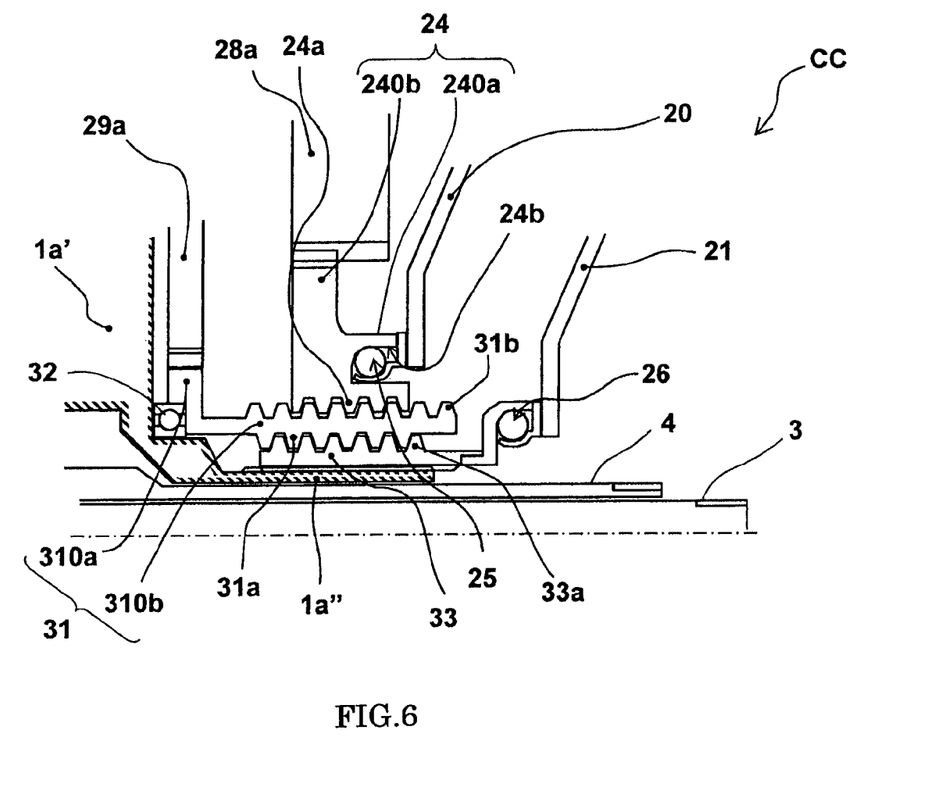
FIG. 6 is an enlarged view of principal portions of the clutch switching device CC of a second embodiment.

Next, the clutch switching device CC of a second embodiment of the invention is explained.

FIG. 6 is an enlarged view of principal portions of the clutch switching device CC of the second embodiment. As shown, the clutch switching device CC of the second embodiment is configured similarly to the clutch switching device C of the first embodiment, except that the fixed sleeve 22 is changed to a driving sleeve 31, the first slider 23 is changed to a first slider 33, and the transmission case 1a is changed to a transmission case 1a'. Hence in the configuration of the clutch switching device CC of the second embodiment, portions which are the same as in the clutch switching device C of the first embodiment are assigned identical reference numbers, and an explanation of the details thereof is omitted.

As shown in FIG. 6, the clutch switching device CC of the second embodiment comprises the clutch switching electronic control unit 13, the first diaphragm spring 20, second diaphragm spring 21, the second slider 24, the first release bearing 25, the second release bearing 26, the first motor 27, the second motor 28, the idler gear mechanism 29, the driving sleeve 31, a bearing 32 and the first slider 33. The driving sleeve 31 is supported via the bearing 32 by a sleeve portion 1a" that is formed in the transmission case 1a' in a state allowing only rotation. The first slider 33 is arranged externally around the sleeve 1a" in a state allowing only movement in the axial direction, and is threadedly engaged with an inside peripheral surface of the driving sleeve 31. The second slider 24 is threadedly engaged on an outside peripheral surface of the driving sleeve 31. The first motor 27 is connected via the idler gear mechanism 29 to the driving sleeve 31. The second motor 28 is connected to the second slider 24. The second release bearing 26 links the first slider 33 and the second diaphragm spring 21. The first release bearing 25 links the second slider 24 and the first diaphragm spring 20. The clutch switching electronic control unit 13 controls the clutch switching device CC.

The driving sleeve 31 comprises a gear portion 310a and a hollow shaft portion 310b. The gear portion 310a meshes with the idler gear 29a. The hollow shaft portion 310b has a hollow interior, and is formed integrally in a shape protruding from the gear portion 310a. The hollow shaft portion 310b has a first female thread 31a formed on its inside peripheral surface, and a first male thread 31b formed on an outside peripheral surface. The first female thread 31a and the first male thread 31b are formed with thread winding directions in mutually opposite directions. That is, the first female thread 31a is formed with a thread sense opposite that of the first male thread 31b.

The first slider 33 is formed in a tube shape, with a spline recess formed on an inside peripheral surface, which mates with a spline ridge formed on an outside peripheral surface of the sleeve portion 1a". The first slider 33 has a second male thread 33a formed on an outside peripheral surface. The second male thread 33a is threadedly engaged with the first female thread 31a.

Here, the leads L1 of the second male thread 33a and the first female thread 31a are in this embodiment set so as to satisfy the formula $L1 < \pi \cdot d1 \cdot \mu 1$, where d1 is the effective thread diameter of the second male thread 33a and the first female thread 31a, and μ1 is the friction coefficient between the second male thread 33a and the first female thread 31a. Also here, the leads L2 of the first male thread 31b and the second female thread 24a are set so as to satisfy the formula $L2 < \pi \cdot d2 \cdot \mu 2$, where d2 is the effective thread diameter of the first male thread 31b and the second female thread 24a, and μ2 is the friction coefficient between the first male thread 31b and the second female thread 24a. The leads L2 of the first male thread 31b and the second female thread 24a is set to be greater than the leads L1 of the second male thread 33a and the first female thread 31a (for example, L2=2×L1).

The second release bearing 26 has an outer race that is fixedly mounted on a tip of the first slider 33 and an inner race that abuts with an inside perimeter tip of the second diaphragm spring 21. The second release bearing 26 links the first slider 33 and the second diaphragm spring 21 in a state which allows relative rotation.

There follows a description of operation when switching of the first clutch 2a and the second clutch 2b is performed by the clutch switching device CC of the second embodiment configured in this way.

Figure 7:
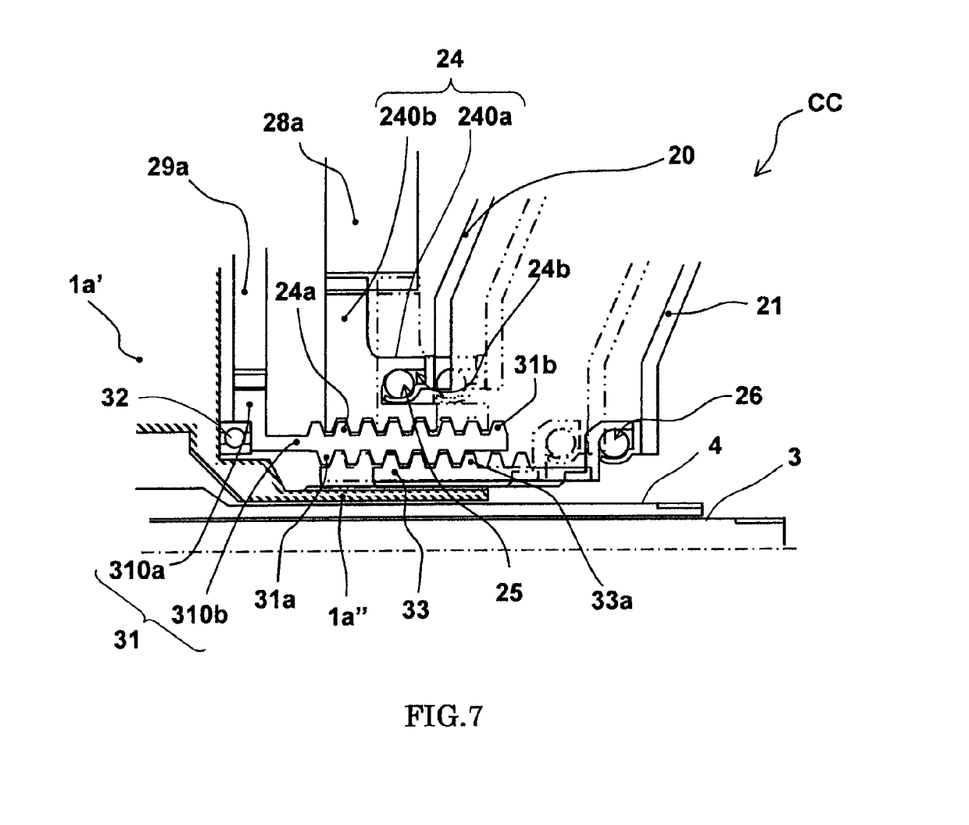
FIG. 7 is a state diagram showing a state of switching of the first clutch 2a and second clutch 2b.

FIG. 7 is a state diagram, showing a state of switching of the first clutch 2a and the second clutch 2b.

First clutch switching at the time the vehicle is started from rest is described. It is assumed that when the vehicle is stationary, the connections of both of the clutches 2a and 2b are released.

When starting from rest, the clutch switching electronic control unit 13 drives and controls the second motor 28 to drive and rotate the second slider 24. In addition, the clutch switching electronic control unit 13 drives and controls the first motor 27 such that the driving sleeve 31 does not rotate.

When the second slider 24 rotates, the second slider 24 rotates over the driving sleeve 31, rotation of which is stopped, while moving in the axial direction towards the side of both of the clutches 2a and 2b (rightward in FIG. 7). The second slider 24 presses the inside perimeter tip of the first diaphragm spring 20, via the first release bearing 25, towards both of the clutches 2a and 2b (rightward in FIG. 5) against the spring force.

The first diaphragm spring 20 thereby deforms so as to move in the direction away from both of the clutches 2a, 2b (leftward in FIG. 7), with the protruding portion 19b'' of the bent member 19 as a fulcrum. As a result, the first pressure plate 16 moves towards the first clutch disc of the first clutch 2a via the drive plate 18. In this way, the friction material of the first clutch 2a is sandwiched between the first pressure plate 16 and the mid-pressure plate 15, and power from the crankshaft 10 is input to the first input shaft 3 via the first clutch 2a.

Here, the leads L1 of the second male thread 33a and the first female thread 31a, and the leads L2 of the first male thread 31b and the second female thread 24a, are set to values so as to satisfy the formulae $L1 < \pi \cdot d \cdot \mu 1$ and $L2 < \pi \cdot d \cdot 2\mu$, so that when connection of the first clutch 2a is completed, even if the current to the first motor 27 and the second motor 28 is stopped, there is no natural axial-direction movement of the first slider 33 and the second slider 24 and no natural switching of the clutches 2a and 2b. As a result, electric power consumption can be reduced.

There follows a description of switching of the first clutch 2a and the second clutch 2b when releasing the connection of the first clutch 2a and connecting the second clutch 2b.

When the connection of the first clutch 2a is released and the second clutch 2b is connected, the clutch switching electronic control unit 13 drives and controls the second motor 28 so as to stop or to rotate in the direction opposite that when starting from rest. In this way, the second slider 24 is driven to rotate in the direction opposite that when starting from rest. Also the clutch switching electronic control unit 13 drives and controls the first motor 27 so as to rotate in the same direction as the second motor 28. In this way, the first slider 33 is driven to rotate via the driving sleeve 31 in the direction opposite that of the second slider 24.

The second slider 24 thereby moves in the axial direction to the side opposite the side of both of the clutches 2a, 2b (leftward in FIG. 7) over the driving sleeve 31 which is rotating in the direction opposite the second slider 24, and the first slider 33 slides over the sleeve portion 1a'' of the transmission case 1a' and moves in the axial direction towards both of the clutches 2a, 2b.

Here, the second male thread 33a and the first female thread 31 a, and the first male thread 31b and the second female thread 24a, are formed with the thread winding directions in opposite directions, so that merely by stopping the second motor 28, or having the second motor 28 rotate in the direction opposite that when starting from rest using less electric power than for the first motor 27, the second slider 24 is moved in the axial direction to the side opposite both of the clutches 2a, 2b (leftward in FIG. 7).

Axial-direction movement of the second slider 24 to the side opposite the side of both of the clutches 2a, 2b (leftward in FIG. 7) causes the deformation of the first diaphragm spring 20 returns to the initial state, and accompanying this the first pressure plate 16 moves away from the side of the first clutch disc of the first clutch 2a, via the drive plate 18, and the connection of the first clutch 2a is released. Axial-direction movement of the first slider 33 towards both of the clutches 2a, 2b (rightward in FIG. 7) causes the first slider 33 to press the inside perimeter tip of the second diaphragm spring 21 towards both of the clutches 2a, 2b (rightward in FIG. 7), via the second release bearing 26, against the spring force.

The second diaphragm spring 21 thereby moves the second pressure plate 17 towards the second clutch disc of the second clutch 2b (rightward in FIG. 7), with the protruding portion 19b' of the bent member 19 as a fulcrum. The friction material of the second clutch 2b is thus enclosed between the second pressure plate 17 and the mid-pressure plate 15, and power from the crankshaft 10 is input via the second clutch 2b to the second input shaft 4.

Next, switching of the first clutch 2a and the second clutch 2b when the connection of the second clutch 2b is released and the first clutch 2a is connected is explained.

When the connection of the second clutch 2b is released and the first clutch 2a is connected, the clutch switching electronic control unit 13 drives and controls the second motor 28 so as to stop or to rotate in the same direction as when starting from rest. In this way, the second slider 24 is driven to rotate in the same direction as when starting from rest. Also the clutch switching electronic control unit 13 drives and controls the first motor 27 so as to rotate in the same direction as the second motor 28. In this way, the first slider 33 is driven to rotate via the driving sleeve 31 in the direction opposite that of the second slider 24.

The first slider 33 and second slider 24 thereby move in the axial directions opposite those when releasing the connection of the first clutch 2a and connecting the second clutch 2b as described above, to release the connection of the second clutch 2b and connect the first clutch 2a.

In the clutch switching device CC of the second embodiment described above, similarly to the clutch switching device C of the first embodiment, the number of components to perform switching of the clutches 2a and 2b can be reduced, and the device as a whole can be made more compact.

In the clutch switching device CC of the second embodiment, the second male thread 33a and the first female thread 31a, and the first male thread 31b and the second female thread 24a, are formed with thread winding directions in opposite directions, but the thread winding directions may be formed in the same direction. In this case, the leads L1 of the second male thread 33a and the first female thread 31a and the leads L2 of the first male thread 31 b and the second female thread 24a may be set to be the same. Moreover the second motor 28 may be driven and controlled in the opposite direction and moreover at twice the rotation rate of the first motor 27, to switch the first clutch 2a and second clutch 2b.

Figure 8:
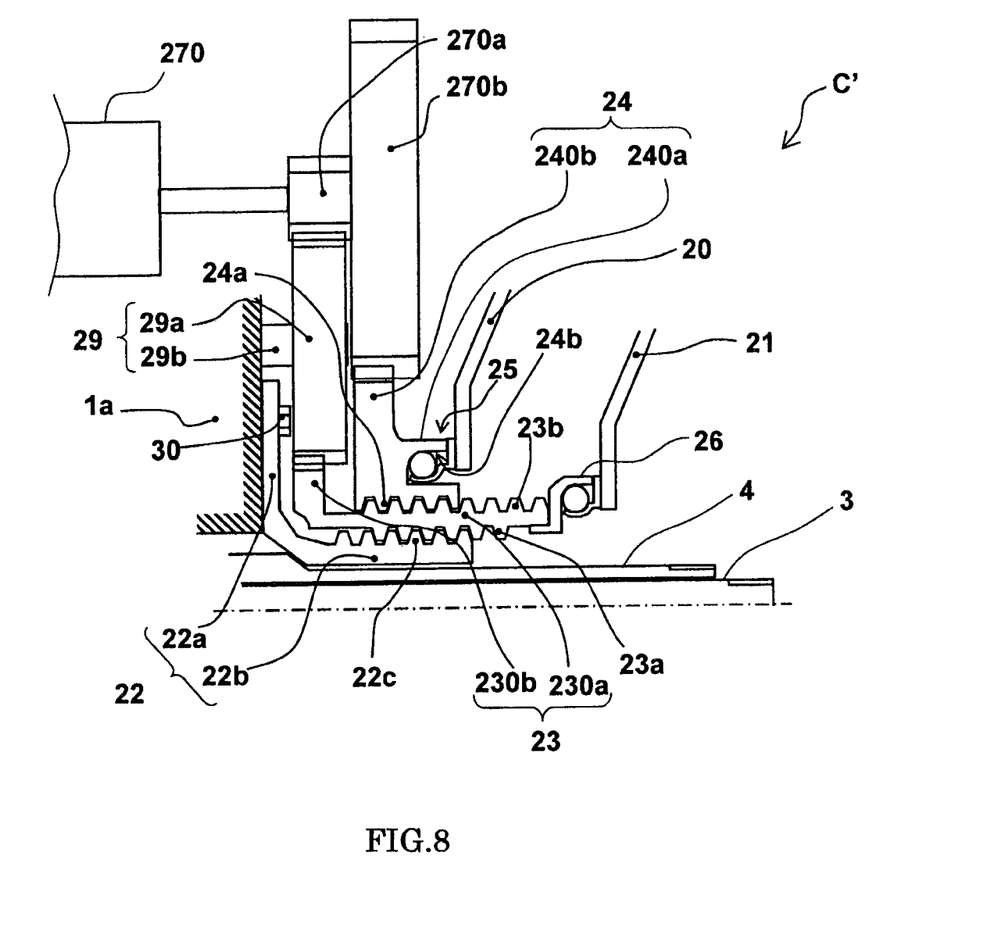
FIG. 8 is an enlarged view of principal portions of the clutch switching device C' of a modified example.
Figure 9:
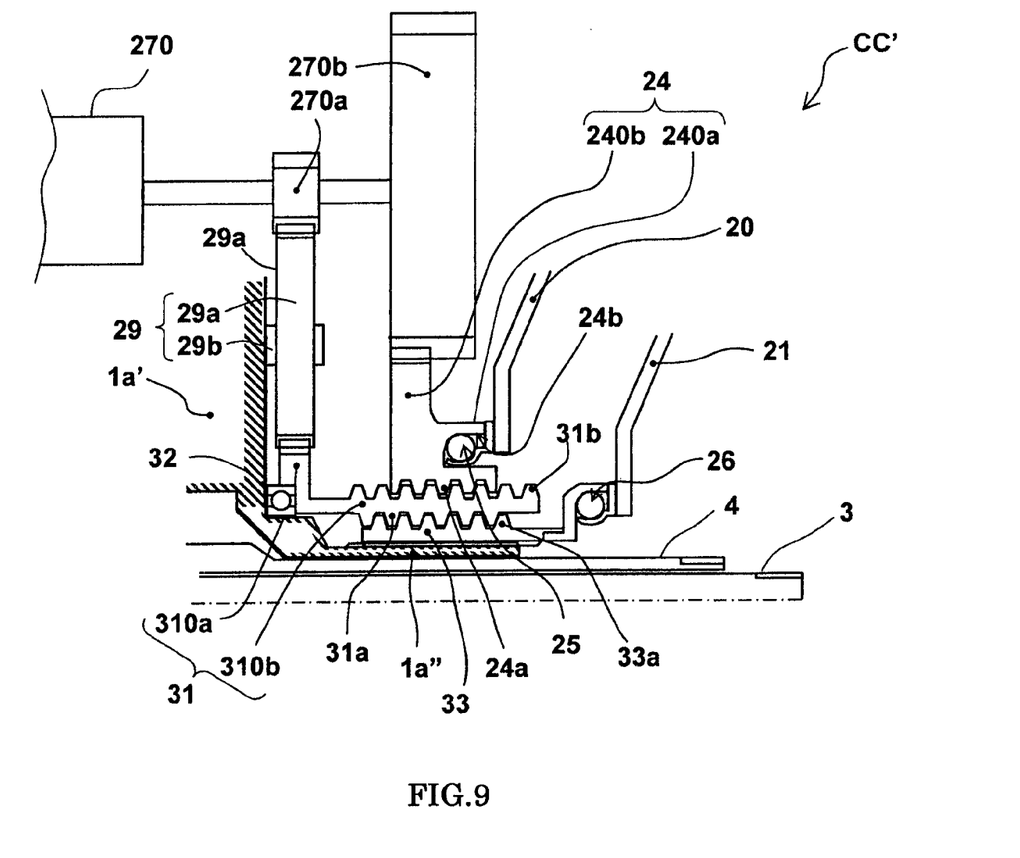
FIG. 9 an enlarged view of principal portions of the clutch switching device C" of a modified example.

In the clutch switching devices C and CC of each of the embodiments, the first slider 23 and the second slider 24, or the driving sleeve 31 and the second slider 24, can be driven in rotation by the first motor 27 and the second motor 28; but as exemplified by the clutch switching devices C' and CC' of the modified examples shown in FIG. 8 and FIG. 9, the first slider 23 and the second slider 24, or the driving sleeve 31 and the second slider 24, may be driven in rotation by a single motor 270.

That is, as shown in FIG. 8 and FIG. 9, a first pinion gear 270a and a second pinion gear 270b are provided on a rotation shaft of one motor 270. The gear portion 230b of the first slider 23 or gear portion 310a of the driving sleeve 31 is made to mesh via the idler gear 29a of the idler mechanism 29 with the first pinion gear 270a. Also the gear portion 240b of the second slider 24 is made to mesh with the second pinion gear 270b.

Further, in FIG. 9, in a case where the thread winding direction of the first male thread 31b and the second female thread 24a and the thread winding direction of the second male thread 33a and the first female thread 31a are formed in the same direction, the idler gear mechanism 29 may be eliminated and the first pinion gear 270a and the gear portion 310a may be meshed directly. Moreover a gear ratio relationship may be set such that the rotation rate of the motor 270 transmitted from the first pinion gear 270a to the gear portion 310a is greater than the rotation rate of the motor 270 transmitted from the second pinion gear 270b to the gear portion 240b. The rotation rate of the driving sleeve 31 thereby can be made lower than the rotation rate of the second slider 24, so that the axial direction in which the first slider 33 moves and the axial direction in which the second slider 24 moves can be made opposite directions.

In the above, aspects of the invention have been explained using embodiments, but the invention is not limited to such embodiments; as shall be apparent, various modes can be implemented without deviating from the gist of the invention.

In the clutch switching device of the present invention described above, one aspect of the clutch switching device may include a first member, a second member, a third member, a first release bearing member, a second release bearing member and an actuator. In one embodiment that is described above, the first member is configured as the driving sleeve, the second member is configured as the first slider, and the third member is configured as the second slider. In the case of this embodiment, the first release bearing member is interposed between the second slider and a first clutch member constituting a part of the first clutch, while the second release bearing member is interposed between the first slider and a second clutch member constituting a part of the second clutch. Also in the case of this embodiment, the actuator is arranged to rotate the driving sleeve and the second slider.

The invention claimed is:

1. A clutch switching device for selectively engaging a first clutch of a first input shaft, which is rotatably supported by a case, and a second clutch of a second input shaft that is disposed coaxially with an outside peripheral side of the first input shaft, and is rotatably supported by the case, the clutch switching device comprising:
    a fixed sleeve having a hollow shaft portion with a first male thread on an outside peripheral surface, the fixed sleeve being configured to be fixedly mounted on the case such that the hollow shaft portion is coaxially arranged on the outside periphery of the second input shaft;
    a first slider having a first female thread on an inside peripheral surface and a second male thread on an outside peripheral surface, the first female thread being threadedly engaged with the first male thread, the first slider being threadedly engaged with the fixed sleeve, being rotatable with respect to the fixed sleeve and being movable in the axial direction;
    a second slider having a second female thread on an inside peripheral surface, the second female thread being threadedly engaged with the second male thread, the second slider being threadedly engaged with the first slider, being rotatable with respect to the first slider and being movable in the axial direction;
    a first release bearing member interposed between the second slider and a first clutch member constituting a part of the first clutch;
    a second release bearing member interposed between the first slider and a second clutch member constituting a part of the second clutch; and
    an actuator arranged to rotate the first slider and the second slider.

2. The clutch switching device according to claim 1, wherein
    the actuator comprises a first motor arranged to rotate the first slider and a second motor arranged to rotate the second slider.

3. The clutch switching device according to claim 2, wherein
    the actuator comprises a reversal mechanism arranged to reverse rotation of one of the first and second motors and transmit power to one of the first and second sliders.

4. The clutch switching device according to claim 2, further comprising
    a driving control unit configured to perform drive control of the first motor and the second motor such that, when a switching instruction for switching between the first clutch and the second clutch is issued, the movement direction of the axial-direction movement of the first slider and the movement direction of the axial-direction movement of the second slider are made mutually opposite directions.

5. The clutch switching device according to claim 1, wherein
    the actuator comprises a motor capable of causing the first and second sliders to rotate, and a reversal mechanism for reversing the rotation of the motor and transmitting power to the first slider or the second slider.

6. The clutch switching device according to claim 1, wherein
    the first male thread and the first female thread have substantially the same lead as the second male thread and the second female thread.

7. The clutch switching device according to claim 1, wherein
    the second male thread and the second female thread have a lead that is larger than a lead of the first male thread and the first female thread.

8. The clutch switching device according to claim 1, wherein
    the second male thread and the second female thread have a lead that satisfies the following relationship: $L<\pi \cdot d \cdot \mu$, where d is an effective thread diameter of the second male thread and the second female thread, and $\mu$ is a coefficient of friction between the second male thread and the second female thread.

9. A clutch switching device for selectively engaging a first clutch of a first input shaft, which is rotatably supported by a case, and a second clutch of a second input shaft that is disposed coaxially with an outside peripheral side of the first input shaft, and is rotatably supported by the case, the clutch switching device comprising:

a first member having a first male thread on an outside peripheral surface and a first female thread on an inside peripheral surface, the first member being configured to rotate relative to the case;

a second member having a second male thread on an outside peripheral surface, the second male thread being threadedly engaged with the first female thread, the second member being threadedly engaged with the first member in a state in which the second member is movable only in the axial direction relative to the case;

a third member having a second female thread on an inside peripheral surface, second female thread being threadedly engaged with the first male thread, the third member being threadedly engaged such that the second member is rotatably mounted and movably mounted in an both rotation and axial-direction relative to the first member;

a first release bearing member interposed between the third member and a first clutch member constituting a part of the first clutch;

a second release bearing member interposed between one of the first and second members and a second clutch member constituting a part of the second clutch; and an actuator arranged to rotate the first member and the third member.

10. The clutch switching device according to claim 9, wherein
the actuator comprises a first motor arranged to rotate the first member and a second motor arranged to rotate the third member.

11. The clutch switching device according to claim 10, wherein
the actuator comprising a reversal mechanism arranged to reverse rotation of one of the first and second motors and transmit power to one of the first member and third member.

12. The clutch switching device according to claim 10, wherein
the first male thread and the second female thread are formed in a thread winding direction opposite a thread winding direction of the second male thread and the first female thread.

13. The clutch switching device according to claim 11, comprising
a driving control unit configured to perform driving control of the first motor and the second motor such that, when a switching instruction for switching between the first clutch and the second clutch is issued, the second member and the third member move in mutually opposite axial directions.

14. The clutch switching device according to claim 9, wherein
the actuator comprises a motor arranged to rotate both the first member and the third member.

15. The clutch switching device according to claim 14, wherein
the motor rotates the third member at a higher speed than the first member.

16. The clutch switching device according to claim 14, wherein
the actuator comprises a reversal mechanism for arranged to reverse rotation of the motor and transmit power to one of the first and third members.

17. The clutch switching device according to claim 16, wherein
the first male thread and the second female thread have a thread winding direction that is opposite to a thread winding direction of the second male thread and the first female thread.

18. The clutch switching device according to claim 9, wherein
the first male thread and the second female thread have a lead that is larger than a lead of the second male thread and the first female thread.

19. The clutch switching device according to claim 9, wherein
the first male thread and the second female thread have a lead that satisfies the following relationship: $L<\pi \cdot d \cdot \mu$, where d is an effective thread diameter of the first male thread and the second female thread, and $\mu$ is a coefficient of friction between the first male thread and the second female thread.

20. A twin-clutch type transmission including the clutch switching device according to claim 1, the twin-clutch type transmission comprising:

a first power transmission path for changing gears to a first gear ratio for inputting power to the first input shaft, and a second power transmission path for changing gears to a second gear ratio for inputting the power to the second input shaft, the twin-clutch type transmission switching between the first clutch and the second clutch using the clutch switching device to switch between the first power transmission path and the second power transmission path, and change gears to transmit the power to an output shaft.

* * * * *